United States Patent [19]

Sendo et al.

[11] 4,296,063

[45] Oct. 20, 1981

[54] METHOD OF PRODUCING BRACKET AND GEAR BOX OF ELECTRIC MOTOR WITH GEAR BOX AND METAL MOLD USED WITH THE SAME

[75] Inventors: Masaaki Sendo; Kinzo Suzuki, both of Nakatsugawa, Japan

[73] Assignee: Mitsubishi Denki Kabushiki Kaisha, Tokyo, Japan

[21] Appl. No.: 75,209

[22] Filed: Sep. 12, 1979

[51] Int. Cl.³ .............................................. B29F 1/10
[52] U.S. Cl. ..................................... 264/273; 249/83; 264/259; 264/275; 264/278; 425/110; 425/125; 425/441; 425/450.1
[58] Field of Search ............... 264/272, 273, 275, 278, 264/318, 328.7, 259; 425/125, 441, 443, 447, 450.1, 577, 110, DIG. 5; 249/64, 67, 83, 95

[56] References Cited

U.S. PATENT DOCUMENTS

| | | | |
|---|---|---|---|
| 3,398,222 | 4/1968 | Kaufman et al. | 264/250 |
| 3,555,606 | 1/1971 | Hedgewick | 425/577 |
| 3,564,660 | 2/1971 | Darnell | 425/192 |
| 3,669,598 | 6/1972 | Tucker | 425/DIG. 5 |
| 3,794,286 | 2/1974 | Davin | 249/67 |
| 3,865,529 | 2/1975 | Guzzo | 425/DIG. 5 |
| 3,904,165 | 9/1975 | Den Boer | 249/67 |
| 4,065,539 | 12/1977 | Nadel | 264/273 |
| 4,082,245 | 4/1978 | Santos | 425/DIG. 5 |
| 4,100,247 | 7/1978 | Shead et al. | 264/275 |
| 4,112,043 | 9/1978 | Williams | 164/98 |
| 4,214,670 | 7/1980 | Berger et al. | 264/275 |

FOREIGN PATENT DOCUMENTS

51-39723 9/1976 Japan .

Primary Examiner—Donald E. Czaja
Assistant Examiner—W. Thompson
Attorney, Agent, or Firm—Wenderoth, Lind & Ponack

[57] ABSTRACT

A first movable mold with both a runner and a core type mold is moved toward a stationary mold, and simultaneously a second movable mold supporting a motor bracket of plate metal is moved toward the stationary and first movable mold until all the molds engage one other to form around the core type mold a predetermined space to which the bracket is exposed a molten resin is poured into the space through the runner to mold a gear box integral with the bracket.

10 Claims, 14 Drawing Figures

METHOD OF PRODUCING BRACKET AND GEAR BOX OF ELECTRIC MOTOR WITH GEAR BOX AND METAL MOLD USED WITH THE SAME

BACKGROUND OF THE INVENTION

This invention relates to a method of producing a bracket and a gear box of an electric motor, and more particularly to a method of connecting the bracket integrally with the gear box formed of an electrically insulating synthetic resinous material. Also the present invention concerns a metal mold used with such a method.

A conventional fan is an example of a machine having an electric motor with a gear box. Such fans involve typically conventional fans. Those fans have been operated to effect ventilation through a plurality of rotary blades mounted at one end of a motor shaft rotated at a high speed while swinging the main fan body several times per minute through a gear disposed within the gear box formed integrally with the motor bracket to engage a worm disposed at the other end of the motor shaft, thereby to decelerate the rotation of the motor shaft.

In such a structure, by which the main motor body swings through the gears as described above, the gear box and the motor bracket formed integral therewith have been required to have both high dimensional accuracy and high strength. In order to fulfill such requirements, the bracket and gear box have been previously formed by die casting aluminium or zinc and the resulting castings have been subjected to after-machining conducted by a machine tool used exclusively for this purpose. This has resulted in the following disadvantages:

(a) Because aluminum or zinc is used as the material, harmful gases are evolved from the material melted at an elevated temperature, for example, about 800° C., during the die casting operation.

(b) Due to the use of a die casting technique, the resulting castings have such low dimensional accuracy as to require after-machining. Therefore the castings must be passed through a special machine tool capable of machining the castings with a machining accuracy of from 1/100 to 1/1000. In this case, scores of machining steps are required and the machining time becomes long.

(c) In order to increase the mass producibility thereof, the special machine tool requires an extensive site for its layout. A rotary type special machine requires only a narrow floor area, but the machining of concentrated lots requires the use of several special machine tools, thus resulting in an increase in costs to be recovered.

From the foregoing it is seen that the bracket and gear box of a fan have been high in cost due to the additional steps added.

Accordingly, it is an object of the present invention to provide a new and improved method of producing a bracket and a gear box of an electric motor inexpensively as a result of existing equipment being used to mold the gear box without the necessity of machining the resulting molding.

It is another object of the present invention to provide a new and improved metal mold to be used in such method.

SUMMARY OF THE INVENTION

The present invention provides a method of producing a gear box and a bracket of an electric motor with the gear box having a variable speed gear disposed therein, such method comprising the steps of putting within a metal mold a motor's bracket formed of plate metal to form a predetermined space between the metal mold and the bracket, and pouring a synthetic resinous material into the predetermined space to mold the gear box of the resinous material with the gear box being connected integrally with the bracket.

The present invention also provides a composite metal mold for carrying out such method, the mold comprising a stationary metallic mold including a runner, a first movable metal mold opposite to the stationary metal mold and capable of being moved toward and away from the stationary metal mold, a core type metal mold attached to the first movable metal mold to oppose the stationary metal mold, the core type metal mold being able to be moved toward and away from the stationary metal mold with the first movable metal mold, and a second movable metal mold disposed oppositely to both the stationary metal mold and the first movable metal mold and capable of being moved toward and away from both the stationary metal mold and the first movable metal mold to effect a two-dimensional movement. The arrangement is such that, a motor bracket is put on a surface of the second movable mold opposite to the first movable mold, and when the first movable metal mold with the core type metal mold and the second movable metal mold engage each other and also the stationary metal mold, a predetermined space is formed around the core type metal mold and between the stationary metal mold, the first movable metal mold and the second movable metal mold. A synthetic resinous material is then poured via the runner into the predetermined space to which the bracket is exposed.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENT

Referring now to FIGS. 1 through 4 of the drawings, there is illustrated a conventional electric motor for a fan. The arrangement illustrated comprises a frame 1 formed by die casting aluminum and provided on the central portion with a bearing unit 2 having a bearing 3 forced into the bearing unit 2 and a felt 4 disposed in the bearing unit 2 and fixed in place by a felt gland 5, the felt including a lubricating oil. A supporting shaft 6 for the electric motor is fixedly fitted into the lower portion of the frame 1 and a stator 7 is rigidly fitted into the frame 1.

Figure 1:
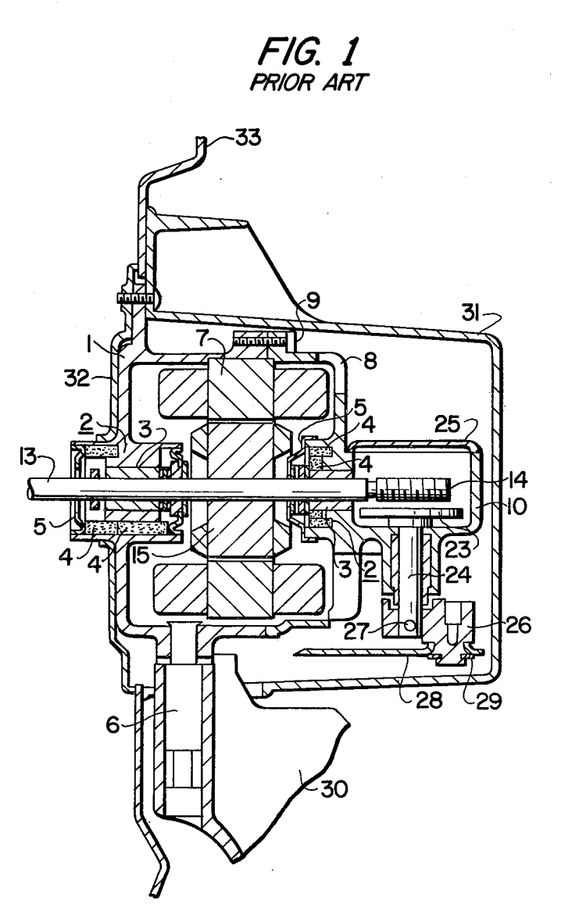
FIG. 1 is a longitudinal sectional view of a conventional electric motor for a fan with parts illustrated in elevation.
Figure 2:
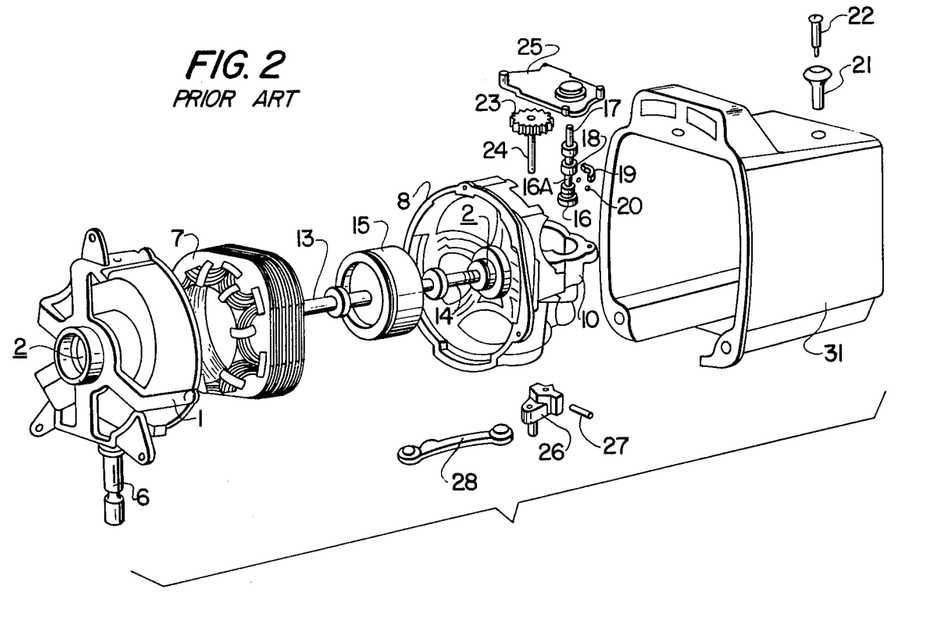
FIG. 2 is an exploded perspective view of the arrangement shown in FIG. 1.
Figure 3:
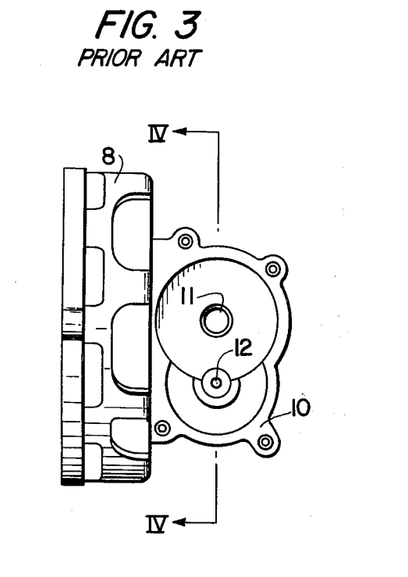
FIG. 3 is a plan view of the bracket and gear box shown in FIGS. 1 and 2.

A bracket 8 formed also by die casting aluminum is fixedly secured to the frame 1 by means of screws 9 to cover one side of the stator 7 and includes a gear box 10 formed integrally therewith. The bracket 8 is provided on the central portion with a bearing unit 2 similar to that of the frame 1, and composed of a bearing 3, a felt 4 disposed to be coaxial with the bearing 3 and a felt gland 5 for holding the felt 4 in place.

Figure 4:
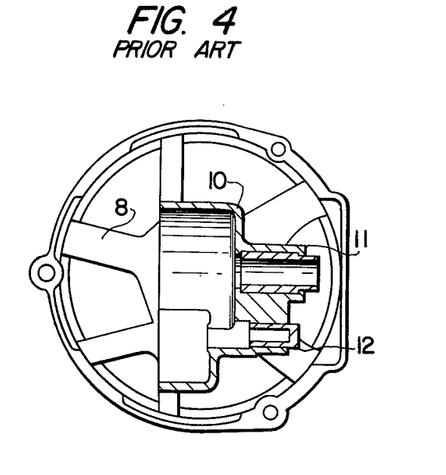
FIG. 4 is a sectional view of the gear box and bracket taken along the line IV—IV of FIG. 3 and viewed in the direction of the arrow.

As best shown in FIG. 4, a crank bearing 11 and a vertical bearing 12 are inserted into the gear box 10, and as best shown in FIG. 1, a rotary motor shaft 13 is rotatably extended through and supported by both bearings 2. The rotary shaft 13 includes one end portion entering the gear box 10 and provided with a worm 14 and another end provided with a plurality of rotatable blades (not shown). A rotor 15 is rigidly fitted onto the rotary motor shaft 13 to face the stator 7 with a narrow spacing formed therebetween.

Disposed within the gear box 10 is a worm gear 16 mounted on a relatively small shaft 16A to engage the worm 14. As shown in FIG. 2, a vertical hollow shaft 17 includes a spur gear 18 and has the small shaft 16A loosely fitted thereonto. A clutch spring 19 acts to cause a pair of balls 20 to engage and disengage the worm gear 16 with and from the vertical shaft 17 under the control of an oscillation switching knob 21 secured to the vertical shaft 17 through a screw 22. The knob 21 is vertically movable to effect the engagement and disengagement between the worm gear 16 and the vertical shaft 17. The spur gear 18 meshes with a spur gear 23 to reduce in rotational speed, and gear 23 is mounted to an upper end of a crank shaft 24 rotatably extending through the crank bearing 11.

The gear box 10 accommodates therein the components as described above and includes an upper open end which is closed with a cover 25.

As shown in FIGS. 1 and 2, a crank 26 is fixedly secured to the lower end portion of the crank shaft 24 through a pin 27. Then a connection rod 28 is rotatably carried at one end by the crank 26 through a washer 29 and rotatably fitted at the other end onto a protrusion (not shown) disposed on a neck piece 30 (see FIG. 1).

The neck piece 30 has the supporting shaft 6 fitted thereinto to support rotatably the main body of the electric motor. The main body of the electric motor includes a rear portion covered by a protective cover 31, and a front surface provided with a front cover 32 to which a guard 33 is attached to cover the rotatable blades (not shown).

In operation an alternating current flows through the stator 7 to rotate the rotary shaft 13. This rotation of the rotary shaft 13 causes the rotation of the rotatable blades (not shown) to ventilate a space where the electric motor is disposed. On the other hand, the worm 14 rotates the worm gear 16 to rotate the spur gear 18 through the vertical shaft 17 and also the spur gear 23 meshing with the spur gear 18. Therefore the crank shaft 24 is rotated but at a reduced speed of rotation. During this rotation of the crank shaft 24 a fulcrum for the crank 26 is moved to oscillate or vibrate the electric motor about the axis of the supporting shaft 6. This oscillating movement can be stopped by disabling a clutch (not shown) through the oscillation switching knob 21.

In conventional electric motors such as shown in FIGS. 1 to 4, both the bracket 8 and the gear box 10 have been formed as follows: The crank shaft 11 and the vertical shaft 12 have been preliminarily disposed in place within an associated mold, and then both the bracket 8 and the gear box 10 have been cast together in the mold after which the bearing 3 for the bracket 8 is forced into a predetermined portion of the resulting casting.

Therefore the mold has been complicated while the die casting operation has been troublesome, thus resulting in expensive castings. Also, as the molding temperature approximates 800° C., the castings have been formed with poor accuracy and have considerable surface roughness. Therefore, it has been necessary to machine the castings by a tool machine specially used for centering thereof.

From the foregoing it is seen that the bracket for conventional electric motors must be machined after the die casting, operation, which is attended with the high cost of equipment, resulting in poor mass producibility and hence expensive products.

Figure 5:
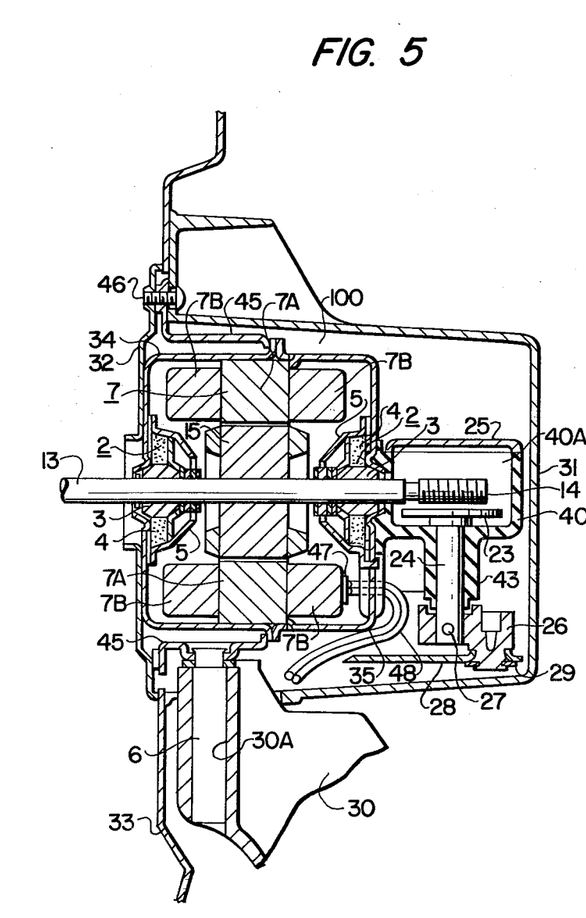
FIG. 5 is a longitudinal sectional view of one embodiment of the electric motor according to the present invention.

FIG. 5 shows, by way of example, an electric motor for a fan produced in accordance with the method of the present invention. In the arrangement illustrated a pair of bearing units 2 are disposed in opposite spaced relationship. Each of the bearing units 2 includes a bearing 3, a felt 4 encircling the bearing 3 and including a lubricating oil for the bearing 3 and a felt gland 5 for fixing the felt 4 in place.

A supporting shaft 6 for an electric motor is fitted into a support member 45 disposed on a lower portion of a frame 34 as will be described hereinafter and a stator 7 is fitted into the frame 34. The stator 7 includes a stator core 7A and a stator coil 7B. A rotary shaft 13 for the electric motor is rotatably supported by both bearing units 2 to extend rotatably through the opposite bearings 3. The rotary motor shaft 13 includes one end portion provided with a worm 14 and another end provided with a plurality of rotatable blades (not shown), while a rotor core 15 is rigidly fitted onto the rotary motor shaft 13 to face the stator 7 through a narrow spacing formed therebetween.

Within a gear box 40, as will be described later, the worm 14 engages a worm gear identical to the worm gear 16 and operatively coupled to components identical to the vertical shaft 17, the spur gear 18, the clutch spring 19, the balls 20 and the spur gear 23 as shown in FIG. 2 in the same manner as described above in conjunction with FIG. 2, although those components are not illustrated except for the spur gear 23. The worm gear is called a first gear and the spur gear 23 is called a second gear.

Further, an oscillation switching knob such as shown by 21 in FIG. 2 is operatively coupled to the component identical to the vertical shaft 17 in the same manner as described above in conjunction with FIG. 2.

As shown in FIG. 5, the gear box 40 includes an upper open end 40A closed with a cover 25 and is formed of any suitable synthetic resinous material.

As in the arrangement shown in FIGS. 1 and 2, the spur gear 23 is mounted to one end of a crank shaft 24 rotatably extending through a crank bearing 43. A crank 26 is fitted onto the crank shaft 24 at the other end and fixed thereto through a pin 27. Then a connection rod 28 is rotatably carried at one end to the crank 26 through a washer 29 and rotatably fitted at the other end into a protrusion (not shown) disposed on a neck piece 30 to be connected thereto. The neck piece 30 includes a circular opening 30A into which the supporting shaft 6 is fitted whereby the same rotatably supports the main body 100 of the electric motor. The main motor body 100 includes a rear portion covered by a protective cover 31 and a front surface to which a front cover 32 is attached. The front cover 32 is provided with a guard 33 for covering the rotatable blades (not shown) as described above.

Figure 6:
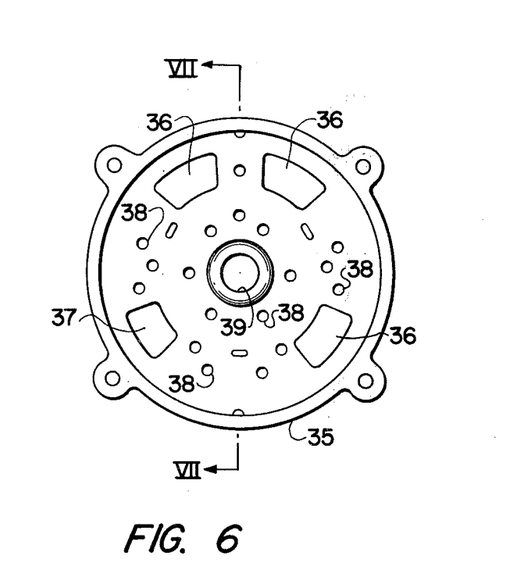
FIG. 6 is a front plan view of the bracket shown in FIG. 5.
Figure 7:
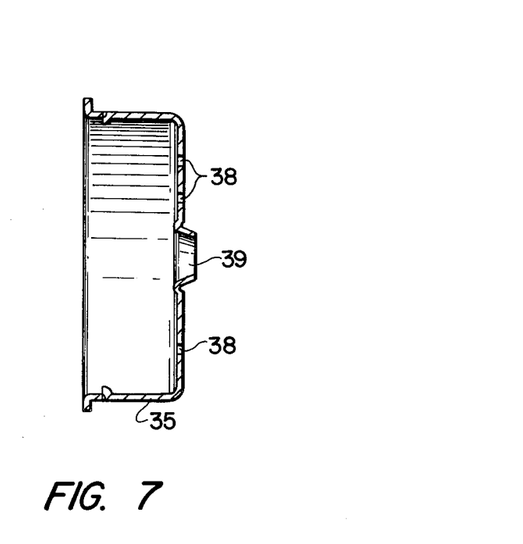
FIG. 7 is a longitudinal sectional view of the bracket taken along the line VII—VII of FIG. 6 and viewed in the direction of the arrow.

The frame 34 is formed into a cup-shaped by a press work operation, with the associated bearing unit 2 disposed on the central portion of a bottom thereof by the mating bearing gland 5. Also, suitable sheet metal is press worked to form a cup-shaped bracket 35 including a bottom 35A and a peripheral wall 35B, see FIG. 12. As shown in FIGS. 6 and 7, the cup-shaped bracket 35 is provided at the bottom 35A with a plurality of vent holes 36, a lead hole 37, a plurality of small holes 38 and a central hole 39. The upper two of the vent holes 36 are symmetric with respect to a diameter of the bracket bottom 35A on which one of the small holes 38 is disposed between the upper vent holes 36. That small hole is designated by the reference numeral 38A. The other bearing unit 2 is partly fitted into and fixed to the central hole 39 by means of the mating bearing gland 5, as shown in FIG. 5.

Figure 8:
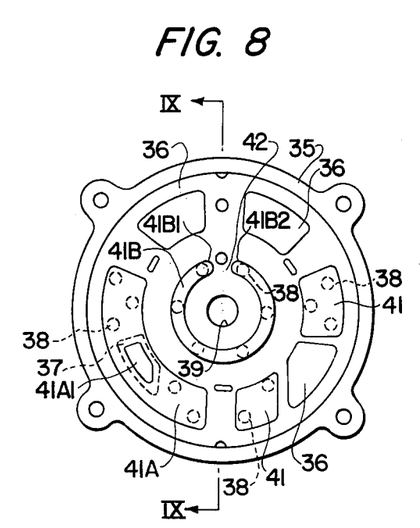
FIG. 8 is a front plan view of the combination of the bracket and gear box shown in FIG. 5.
Figure 9:
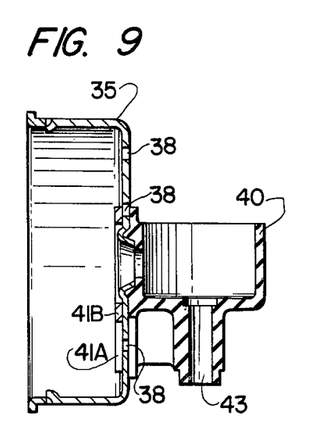
FIG. 9 is a longitudinal sectional view of the bracket and gear box taken along the line IX—IX of FIG. 8 and viewed in the direction of the arrow.
Figure 10:
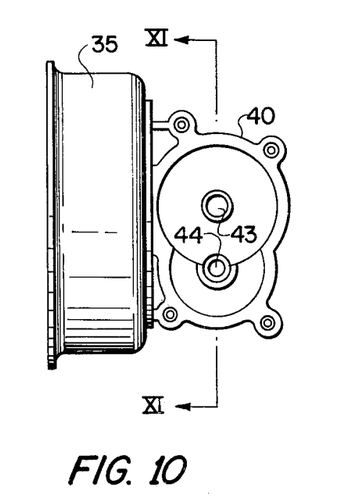
FIG. 10 is a front plan view of the bracket and gear box shown in FIG. 8.
Figure 12:
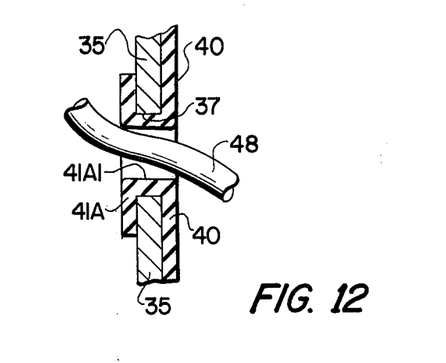
FIG. 12 is an enlarged side sectional view illustrating the lead extending portion shown in FIG. 5.

The gear box 40 is disposed on the outside of the bottom 35A of the bracket 35 to form a unitary structure with the latter. The gear box 40 is formed of an electrically insulating synthetic resinous material, for example, polyacetal. It is to be understood that the present invention is not restricted to the use of polyacetal. As shown in FIGS. 8 and 9, the gear box 40 includes a lateral wall rigidly attached to the outer bottom of the bracket 35 except for the vent holes 36, the lead hole 37 and the central hole 39 and includes a plurality of fixing portions 41, 41A and 41B extending from the lateral wall through the small holes 38 to form discrete portions on the inner bottom of the bracket 35. The fixing portions have a common predetermined thickness by which they project from the bracket 35 toward the stator 7. As best shown in FIG. 8, the fixing portion 41B is in the form of a segment of a circle with a predetermined diameter concentric with and located nearest to the central hole 39 through which the rotary motor shaft 13 extends rotatably. The segment of the circle 41B includes a pair of opposite ends 41B1 and 41B2 between which a small opening 42 is disposed to open on the adjacent felt 4 through an aligned hole disposed in the bottom of the bracket 35. Also the lead hole 37 includes a peripheral wall coated with a resinous layer extending from the lateral wall of the gear box 40 and continuous to an adjacent fixing portion 41A on the inner bottom of the bracket 35 surrounding the lead hole 37 to leave a opening 41A1 as best shown in FIG. 12.

Figure 11:
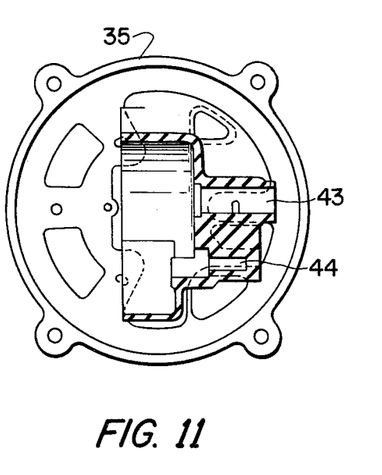
FIG. 11 is a sectional view of the bracket and gear box taken along the line XI—XI of FIG. 10 and viewed in the direction of the arrow with parts illustrated in plan.

Also as best shown in FIGS. 9 and 11, the crank bearing 43 and the vertical bearing 44 are moulded simultaneously with the molding of the gear box 40, as parts of the latter.

The cover 25 is preferably of the same resinous material as the gear box 40.

As shown in FIG. 5, the front cover 32 and the protective cover 31 sandwich one end of the support member 45 therebetween, the three being connected together through a screw 46.

The frame 34 is suitably connected to the bracket 35 by having both open ends abutting against each other. The supporting member 45 includes another end abutting against the abutting portions of the frame 34 and the bracket 35.

As shown in FIG. 5, a terminal block 47 is attached to that portion of the stator coil 7B adjacent to the lead hole 37 on the bracket 35, while a pair of leads 48 are connected to both ends of the stator coil 7B through the utilization of the terminal block 47. The leads 48 extend through the hole 41A1 located within the lead hole 37 as best shown in FIG. 12 for the purpose of supplying electric energy to the stator coil 7B.

The electric motor as shown in FIGS. 5 to 12 is identical in operation to the conventional electric motor as shown in FIGS. 1 to 4. It is noted that the small opening 42 serves to cause a lubricating oil to flow easily into the adjacent felt 4 upon oiling.

A device for carrying out the method of the present invention will now be described in conjunction with FIGS. 13 and 14 wherein the device is shown as comprising a composite metal mold. The arrangement illustrated comprises a stationary metal mold or mold member 49 including a hole 50 extending through an end portion, in this case, an upper end portion thereof as viewed in FIG. 13 to be substantially perpendicular to the inner surface thereof, a tilted guide pin 51 fixedly extending through the lower portion thereof and a runner 52 extending through an intermediate portion thereof to be substantially perpendicular to the inner surface thereof and terminate at an outlet having a predetermined profile for a purpose as will be apparent later.

A guide pin 53 fixedly extends through a first movable metal mold or mold member 54 to be permitted to be slidably fitted into the hole 50 on the stationary mold 49. The first movable mold 54 is disposed oppositely to the stationary metal mold 49 and includes an inner surface capable of abutting against that of the stationary metal mold 49 in its molding position.

A second movable metal mold or mold member 55 is disposed below the first movable metal mould 54 with the longitudinal axis lying on the inner surface of the latter and also opposite to the lower portion of the stationary metal mold 49. The second movable metal mold 55 includes an upper portion in the form of a circular cylinder facing the first movable metal mold 54, and an intermediate portion in the form of a rectangular or a square prism larger in radial dimension than the upper portion and including a tilted hole 56 extending throughout the same to be normally fitted onto the free end portion of the tilted guide pin 51 on the stationary metal mold 49. One half, in the example illustrated a left half as viewed in FIG. 13, of the intermediate mold 55 portion includes a bottom substantially parallel to the tilted hole 56 and the other half thereof extends away from the upper mold portion to form a lower portion of the mold 55 terminating at a bottom perpendicular to the longitudinal axis thereof.

In order to lap the upper portion of the second movable metal mold 55 with the bracket 35 as shown in FIGS. 6 and 7, the upper portion has a diameter somewhat smaller than the inside diameter of the bracket 35 and has an axial length slightly larger than that of the peripheral bracket wall 35B with a stepped portion disposed at the bottom to have an outside diameter permitting the end of the peripheral bracket wall 35B to be loosely fitted onto that stepped portion. This outside diameter is labelled A and is determined by taking account of a tolerance of the inside diameter of the bracket 35 because the latter is a press work article the inside diameter of which may be more or less different from that of any other press work article.

The second movable metal mold 55 includes a centering pin 57 screw threadedly extending therethrough along the longitudinal axis thereof and having a tapered end 57A protruding somewhat beyond the surface of the upper portion thereof facing the first movable metal mold 54. The tapered end 57A is complementary in shape to the central hole 39 on the bracket 35 as best shown in FIG. 7.

The upper surface of the second movable metal mold 55 facing the mold 54 includes a plurality of recesses 55A arranged in the same pattern as and substantially complementary in shape to the fixing portions 41, 41A and 41B as shown in FIG. 8. The upper surface of mold 55 includes also a positioning pin 55B fitted into the small hole 38A on the bracket 35 which is placed upside down on the upper surface by having its central hole 39 engaging the tapered pin end 57B. The positioning pin 55B serves to prevent the bracket 35, when placed on the second movable metal mold 55, from turning about its longitudinal axis.

Figure 13:
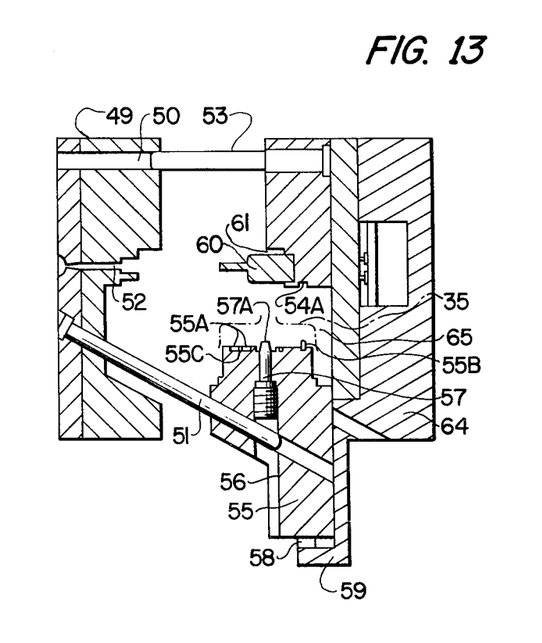
FIG. 13 is a sectional view of a device for carrying out the method of the present invention illustrated in the preparatory stage before the pouring of a synthetic resinous material.
Figure 14:
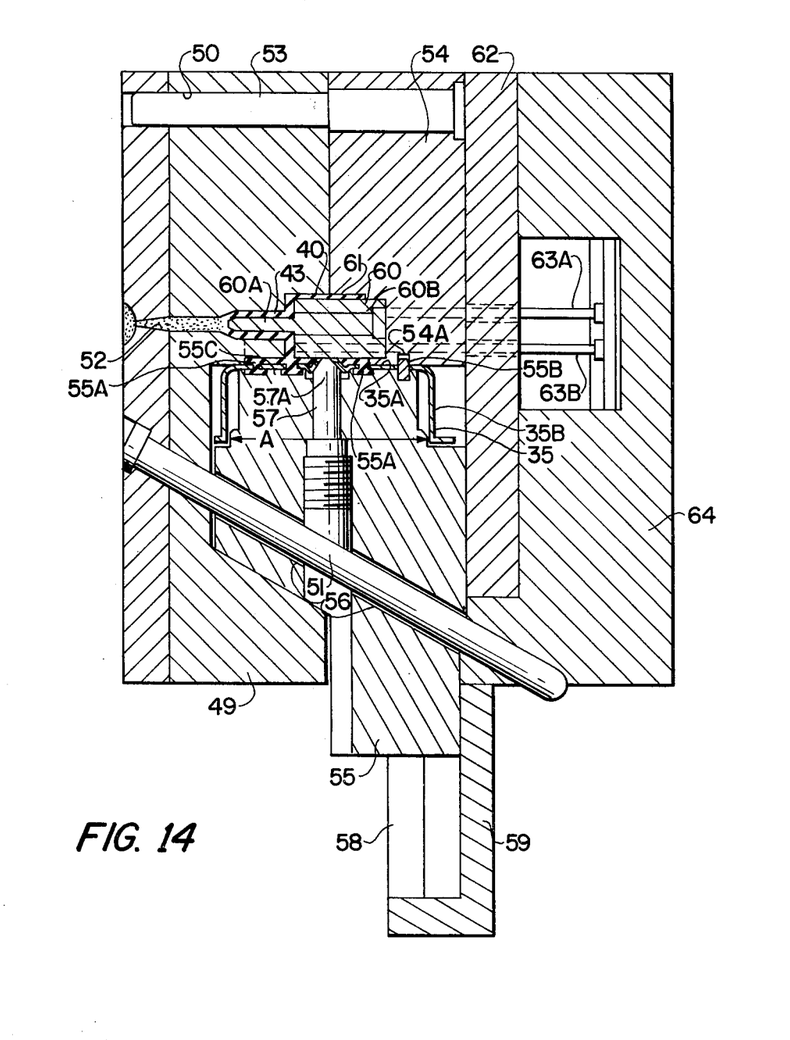
FIG. 14 is an enlarged sectional view of the device shown in FIG. 13 illustrated at the stage at which the molten resinous material is being poured thereinto.

The stationary metal mold 49 has disposed below the runner 52 a recess capable of receiving just that half of the secondary movable metal mold 55 nearer to the same and includes an upper wall as viewed in FIG. 13 provided with a step for a purpose as will be apparent hereinafter.

It will readily be understood that the upper stepped wall of the recess in the stationary metal mold 49 and the lower surface of the second movable metal mold 55 are provided with protuberances so positioned and dimensioned that the vent holes 36 on the bracket 35 are prevented from being filled with a synthetic resinous material during the molding of the gear box 40 as will be described later. Also a protrusion extends from that recess on the upper surface of mold 55 overlaid with the lead hole 37 during the molding to reach the upper stepped wall of the recess in the stationary metal mold 49 through the hole 37 for the purpose of forming the lead hole 41A1 surrounded by a synthetic resinous material. However the protuberances and protrusion are not illustrated only for purposes of clarity of illustration. The first movable metal mold 54 has a small hole 54A disposed on the lower surface to be aligned with the positioning pin 55B on the second movable metal mold 55.

The second movable metal mold 55 is arranged to be guided by a guide pin 58 extending from one leg of an L-shaped supporting plate 59 and to be slidably supported by the other leg thereof. The guide pin 58 serves to move the second movable metal mold 55 toward and away from the first movable metal mold 54.

The first movable mold 54 is provided on the lower and lefthand corner portion as viewed in FIG. 13 with a core type metal mold 60 that can be suitably cooled. The core type metal mold 60 is formed of a central mold portion in the form of a stepped rod 60A and a peripheral mold portion 60B encircling in contact relationship a larger diameter part of the central mold portion 60A as best shown in FIG. 14. The peripheral core mold portion 60B has its end snugly fitted into a cavity disposed on the lower and lefthand portion of the first movable metal mold 54 to be complementary in shape to the latter to form a predetermined space 61 between the same and the adjacent portion of the mold 54 except for that surface thereof facing the second movable metal mold 55. Such space has an open end determining the open end of the gear box 40 (see FIGS. 5 and 9).

The first movable mold 54 is connected to another supporting plate 62, substantially flush with the other leg of the L-shaped supporting plate 59. A pair of supporting rods 63A and 63B loosely extend through the supporting plate 62 to support the central and peripheral mold portions 60A and 60B, respectively.

A coupling member 64 is connected to the supporting plates 59 and 62 and serves to connect operatively both plates to a driving mechanism (not shown) by which the composite mould as described above is opened and closed.

From the foregoing it will readily be understood that the coupling member 64 is moved toward and away from the stationary mold 49 to move the first movable mold 54 toward and away from the stationary mold 49 while it is guided by the guide pin 53. At the same time the second movable mold 55 is moved toward and away from both the stationary and movable molds 49 and 54 while it is guided by both the tilted guide pin 51 and the guide pin 58. That is, the second movable mold 55 is moved in a two dimensional manner with respect to the stationary mold 49.

The first movable mold 54 with the core type mould 60 and the movable mold 55 have to be moved away from the stationary mould 49 as described above until the mould open positions are reached as shown in FIG. 13.

As shown in FIG. 13, a predetermined space 65 is formed above the second movable mold 55 and is utilized to position the bracket 35, as schematically shown by dotted lines, in the space 65 and on the second movable mold 55 by having the central opening 39 engaging the centering pin 57. Then the positioning pin 55B is fitted into the small hole 38A on the bracket 35 to position the latter on the upper surface of the second movable mold 35.

Following this, the operating member 64 is moved toward the stationary mold 49 to initiate the mold closing operation. In the mold closing operation the first movable mold 54 with the core type mold 60 is guided by the guide pin 53 to be moved toward the stationary mold 49 while at the same time second movable mold 55 is guided by the guide pins 51 and 58 to be moved toward both the stationary mold 49 and the first movable mold 54 to force the bottom 35A of the bracket 35 toward the first movable mold 54 until the bracket is partly sandwiched between both molds 49, 54 and 55. At the same time, the first movable mold 54 abuts against the stationary mold 49 and the second movable mould 55 also engages the latter as shown in FIG. 14. At that time, the core type mold 60 forms a predetermined space with the adjacent portions of the molds 49, 54 and 55 as shown in FIG. 14. This space is also designated by the reference numeral 61 and is smoothly merged into the space 61 formed between the peripheral mold portion 60B of the core type mold 60 and the adjacent portion of the first movable mold 54 as described above. Under these circumstances the bracket 35 has the bottom 35A exposed to the space 61 and abuts against a land portion 55C of the surface of the mold 55 facing the molds 49 and 54 while the recesses 55A form space portions for the fixing portions 41, 41A and 41B with the bracket bottom 35A. Further the vent holes 36 are fully closed with the protuberances on the molds 49 and 54 as described above and the protrusion extends through the lead hole 37 and contacts the mold 49.

In other words, the main body of the gear box 40 is determined by the peripheral core mold portion 60B and that portion of the surface of mold 55 opposite to the latter and also by the upper stepped wall of the recess in the mold 49 and that portion of the surface of mold 55 opposite to the latter, while the crank bearing 43 is determined by the exposed part of the central core portion 60A inserted into the runner 52.

Then a thermosetting or a thermoplastic resin, for example, a polyacetal resin heated to about 200° C. to be melted, is poured into the space 61 through the runner 52 to be molded into gear box 40. After the lapse of a predetermined time interval the molds 49, 54 and 55 are separated from one another by moving the coupling member 64 away from the stationary mold 49. Then one can remove from the second movable mold 55 the gear box 40 connected integrally with the outer bottom surface of the bracket 35 as shown in FIGS. 8 and 9.

It has been found that the resulting molding has a high dimensional accuracy and is not required to undergo after-machining.

The bracket 35 includes a plurality of small holes 38 as shown in FIGS. 6 and 7 with a plurality of molded fixing portions 41, 41A and 41B fixedly extending through the small holes 38. The purposes of the small holes 38 are to improve the stream of the melted resin, to decrease mold strinkage and to improve the strength and the creep characteristics of the molding.

Since motor brackets such as the bracket 35 are formed by pressing plate metal and so-called press articles, the resulting inside dimensions may be more or less different from one another. For this reason, the outside diameter A of the upper mold 55 portion is determined by taking account of the tolerance of the inside diameter of the bracket 35 as described above. However, minute dimensional differences within the tolerances of their axial dimensions are automatically accommodated because the centering pin 57 has the tapered end 57A. Further, the tapered end 57A of the centering pin 57 makes it easy to release the gear box molded to be integral with the bracket 35 from the second movable mold 55.

In summary, the present invention provides a method of molding a gear box to be integral with a bracket of an electric motor such method including the steps of putting within a metal mold a bracket formed of plate metal to form a predetermined space between the metal mold and the bracket and pouring a synthetic resinous material into the predetermined space. Therefore, the bracket and the molded gear box have high dimensional accuracy. Accordingly, the present invention eliminates the necessity of subjecting the molding to after-machining as previously required. This eliminates the need for a machine tool used exclusively for effecting the after-machining. In addition, the method of the present invention can be carried out by existing presses and molding machines and therefore is economical. This results in inexpensive products.

While the present invention has been illustrated and described in conjunction a preferred embodiment thereof, it is to be understood that numerous changes and modifications may be resorted to without departing from the spirit and scope of the present invention. For example, the present invention is equally applicable to electric motors other than fan motors. Also, the pattern in which the cavities and others are arranged on the surface of the second movable metal mold may be changed in accordance with the particular application.

What we claim is:

1. A method for producing an integral unit including a metal bracket having attached thereto a gear box formed of synthetic resinous material, said unit being of the type to be used in an electric motor, said method comprising:

providing a plate metal bracket;

providing a composite metal mold including a stationary mold member, a first movable mold member and a second movable mold member;

moving said first and second movable mold members relative to each other and to said stationary mold member to a mold open position providing an open space between said first movable mold member and said second movable mold member;

positioning said plate metal bracket on one of said movable mold members within said open space;

moving said first movable mold member in a first direction toward said stationary mold member while guiding said first movable mold member along a first guide means extending in said first direction, and moving said second movable mold member, in a second direction inclined to said first direction, toward both said first movable mold member and said stationary mold member while guiding said second movable mold member along a second guide means extending in said second direction and along a third guide means extending transverse to said first direction, to thereby move said movable mold members to a mold closed position closing said open space and providing predetermined spacings between said plate metal bracket and said mold members;

introducing synthetic resinous material into said predetermined spacings, and thereby forming a gear box integrally connected to said plate metal bracket as a unit;

moving said movable mold members in directions opposite to said first and second directions to said mold open position; and removing said integral unit of said gear box and said plate metal bracket from said mold.

2. A method as claimed in claim 1, wherein said plate metal bracket has therethrough a plurality of holes, and said step of introducing comprises passing portions of said synthetic resinous material through at least one of said holes, thereby integrally connecting said synthetic resinous material to said plate metal bracket.

3. A method as claimed in claim 1, wherein said one movable mold member includes a centering pin, said plate metal bracket has therein a central hole, and said step of positioning comprises mounting said plate metal bracket with said centering pin extending into said central hole.

4. A method as claimed in claim 3, wherein said central hole and said centering pin are mutually tapered.

5. A method as claimed in claim 1, wherein said guide means comprise guide pins.

6. A composite metal mold for producing an integral unit including a plate metal bracket having attached thereto a gear box formed of synthetic resinous material, said unit being of the type to be used in an electric motor, said mold comprising:

a stationary mold member;

a first movable mold member mounted opposite said stationary mold member;

first means mounting said first movable mold member for movement in a first direction between a mold open position, whereat said first movable mold member is spaced from said stationary mold member, and a mold closed position, whereat said first movable mold member is adjacent said stationary mold member, said first mounting means comprising a first guide means extending in said first direction;

a second movable mold member mounted opposite both said stationary mold member and said first movable mold member;

second means mounting said second movable mold member for movement in a second direction inclined to said first direction between said mold open position, whereat said second movable mold member is spaced from both said stationary mold member and said first movable mold member, and said mold closed position, whereat said second movable mold member is adjacent both said stationary mold member and said first movable mold member, said second mounting means comprising a second guide means extending in said second direction and a third guide means extending transverse to said first direction;

a core type mold member attached to said first movable mold member and movable therewith;

said first and second movable mold members, when in said mold open position, defining therebetween an open space into which a plate metal bracket may be introduced and positioned on said second movable mold member;

said mold members, when in said mold closed position, closing said open space and defining predetermined spacings between the plate metal bracket and said mold members; and said stationary mold member having extending therethrough runner means for the supply of synthetic resinous material into said predetermined spacings and for thereby forming a gear box integrally connected to the plate metal bracket.

7. A mold as claimed in claim 6, wherein said second movable mold member includes a centering pin for extending through a central hole in the plate metal bracket and thus mounting the plate metal bracket.

8. A mold as claimed in claim 7, wherein said centering pin has a tapered outer end adapted to be received in a complementary shaped central hole of the plate metal bracket.

9. A mold as claimed in claim 6, wherein said first guide means comprises at least one supporting pin.

10. A mold as claimed in claim 6, wherein said second and third guide means comprise first and second supporting pins inclined with respect to each other.

* * * * *